(12) United States Patent
Hogan et al.

(10) Patent No.: US 7,816,483 B2
(45) Date of Patent: Oct. 19, 2010

(54) AMINE FUNCTIONALIZED POLYMER

(75) Inventors: Terrence E. Hogan, Akron, OH (US);
David F. Lawson, Uniontown, OH (US);
Yuan-Yong Yan, Copley, OH (US)

(73) Assignee: Bridgestone Corporation (JP)

( * ) Notice: Subject to any disclaimer, the term of this patent is extended or adjusted under 35 U.S.C. 154(b) by 491 days.

(21) Appl. No.: 11/502,228

(22) Filed: Aug. 10, 2006

(65) Prior Publication Data

US 2007/0037956 A1 Feb. 15, 2007

Related U.S. Application Data

(60) Provisional application No. 60/707,269, filed on Aug. 11, 2005.

(51) Int. Cl.
*C08G 8/02* (2006.01)
(52) U.S. Cl. ............... 528/125; 525/331.9; 525/327.6; 525/329.3; 525/329.9; 525/330.9
(58) Field of Classification Search ............... 525/331, 525/332, 333, 377, 331.9, 327.6, 329.3, 329.9; 528/125
See application file for complete search history.

(56) References Cited

U.S. PATENT DOCUMENTS

| | | | |
|---|---|---|---|
| 3,322,738 A * | 5/1967 | Uraneck et al. ............... 526/83 |
| 4,675,355 A | 6/1987 | Hirata et al. | |
| 6,512,051 B2 | 1/2003 | Chino et al. | |
| 6,746,562 B2 | 6/2004 | Chino et al. | |
| 6,809,157 B2 | 10/2004 | Chino et al. | |
| 7,067,592 B2 | 6/2006 | Chino et al. | |
| 7,125,934 B1 | 10/2006 | Parker | |
| 2003/0022993 A1 | 1/2003 | Arakawa et al. | |
| 2003/0050507 A1* | 3/2003 | Couturier et al. ............ 564/300 |
| 2006/0189755 A1 | 8/2006 | Chino et al. | |
| 2006/0199917 A1 | 9/2006 | Chino et al. | |

OTHER PUBLICATIONS

P. Zuman and B. Shah, "Addition, Reduction, and Oxidation Reactions of Nitrosobenzene," *Chem. Rev.*, 1994, 94, pp. 1621-1641 (American Chemical Society).
J. Lee, L. Chen, A.H. West, and G.B. Richter-Addo, "Interactions of Organic Nitroso Compounds with Metals," *Chem. Rev.*, 2002, 102, pp. 1019-1065 (American Chemical Society).
B.G. Gowenlock and G.B. Richter-Addo, "Preparations of C-Nitroso Compounds," *Chem. Rev.*, 2004, 104, pp. 3315-3340 (American Chemical Society).

* cited by examiner

*Primary Examiner*—James Seidleck
*Assistant Examiner*—Gregory Listvoyb
(74) *Attorney, Agent, or Firm*—Meredith E. Hooker; David Burleson

(57) ABSTRACT

A functionalized polymer includes a polymer chain and, bonded thereto, a functional group having the general formula —NQOR$^1$ where R$^1$ is a hydrogen atom or —CH$_2$Z where Z is a hydrogen atom or a substituted or unsubstituted aryl, alkyl, alkenyl, alkenaryl, aralkenyl, alkaryl, or aralkyl group and where Q is a moiety connected to the nitrogen atom of the functional group through a C, N, O, or S atom. The material can be the reaction product of a living polymer and a compound that includes nitroso functionality. The functional group can interact with particulate filler such as, e.g., carbon black.

20 Claims, No Drawings

AMINE FUNCTIONALIZED POLYMER

CROSS-REFERENCE TO RELATED APPLICATION(S)

This application claims the benefit of U.S. provisional application No. 60/707,269, filed Aug. 11, 2005.

BACKGROUND INFORMATION

1. Field of the Invention

The invention relates to the manufacture and use of polymers, particularly to functionalized polymers that can exhibit enhanced interactivity with fillers.

2. Background of the Invention

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemical modifications to the terminal ends of the polymers.

Where a polymer is made by anionic polymerization techniques, attachment of certain functional groups is difficult; living polymers are terminated by active hydrogen atoms such as are present in, e.g., primary and secondary amine groups. Because amine functional groups can provide desirable interaction with particulate fillers, particularly carbon black, commercially useful methods of providing living polymers with terminal amine functionality remains desirable.

SUMMARY

In one aspect is provided a macromolecule that includes a polymer chain and, bonded thereto, a functional group having the general formula

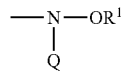

where $R^1$ is a hydrogen atom or a moiety of the general formula —$CH_2Z$ where Z is a hydrogen atom or a substituted or unsubstituted aryl, alkyl, alkenyl, alkenaryl, aralkenyl, alkaryl, or aralkyl group (with "substituted" meaning that the group contains a heteroatom or functionality that does not interfere with the intended purpose of the group) and where Q is a moiety that connects to the nitrogen atom of the functional group through a C, N, O, or S atom.

In another aspect is provided a functional polymer including the reaction product of a living polymer and a compound that includes nitroso functionality.

The functional group included in the just mentioned macromolecule and that is provided in the foregoing functionalized polymer can interact with particulate filler such as, e.g., carbon black. Compositions that include particulate fillers and the macromolecule or the functionalized polymer also are provided.

Other aspects of the present invention will be apparent to the ordinarily skilled artisan from the detailed description that follows.

DETAILED DESCRIPTION OF ILLUSTRATIVE EMBODIMENTS

To assist in understanding the following description of various embodiments, certain definitions are provided immediately below. These are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"macromolecule" means a polymer that includes at least one group or substituent not originating or directly derived from its mer units;

"polyene" means a molecule with at least two double bonds located in the longest portion or chain thereof, and specifically is inclusive of dienes, trienes, and the like;

"terminus" means an end of a polymeric chain;

"oxyamine" means a moiety in which an oxygen atom is bonded directly to an amino nitrogen atom and to at least one other atom or radical and is inclusive of hydroxylamines, alkoxyamines, etc.; and "hysteresis" means the difference between the energy applied to deform an article made from an elastomeric compound and the energy released as the article returns to its initial, non-deformed state.

Throughout this document, all values given in the form of percentages are weight percentages unless the surrounding text explicitly indicates a contrary intention.

The macromolecule includes a polymeric chain with at least one functional group having the general formula —$NQOR^1$, where Q and $R^1$ are defined as above, attached thereto. The at least one functional group can constitute the "at least one group or substituent" in the foregoing definition of macromolecule.

The polymeric chain can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene. Homo- and interpolymers that include just polyene-derived mer units constitute one illustrative type of elastomer.

The polymeric chain also can include pendent aromatic groups such as can be provided through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from about 1 to about 50% by wt., from about 10 to about 45% by wt., or from about 20 to about 35% by wt., of the polymer chain; such interpolymers constitute one exemplary class of polymers.

The microstructure of such interpolymers can be random, i.e., the mer units derived from each type of constituent monomer preferably do not form blocks and, instead, are incorporated in a non-repeating, essentially simultaneous manner. Random microstructure can provide particular benefit in certain end use applications such as, e.g., rubber compositions used in the manufacture of tire treads.

Exemplary elastomers include poly(butadiene), (poly)isoprene (either natural or synthesized), and interpolymers of butadiene and styrene such as, e.g., copoly(styrene/butadiene) also known as SBR.

Polyenes can incorporate into polymeric chains in more than one way. Especially for tire tread applications, controlling this manner in which polyenes incorporate themselves into the polymer chain (i.e., the 1,2-microstructure of the polymer) can be desirable. A polymer chain with an overall 1,2-microstructure, based on total polyene content, of from about 10 to about 80%, optionally from about 25 to 65%, can be desirable for certain end use applications. A polymer that has an overall 1,2-micro-structure of no more than about 50%, preferably no more than about 45%, more preferably no more than about 40%, even more preferably no more than about 35%, and most preferably no more than about 30%, based on total polyene content, is considered to be "substantially linear".

The number average molecular weight ($M_n$) of the polymer typically is such that a quenched sample exhibits a gum Mooney viscosity ($ML_4/100°$ C.) of from ~2 to ~150, more commonly ~2.5 to ~100, even more commonly ~5 to ~90, most commonly ~10 to ~75.

Elastomers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Solution polymerization typically involves an initiator. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators also can be useful. These become incorporated into the polymer chain, thus providing a functional group at the initiated end of the chain. Examples of such materials include lithiated aryl thioacetals (see, e.g., WO 2004/041870) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815, the relevant teachings of which are incorporated herein by reference).

Useful anionic polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization of the mer units and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds having a heteroatom with a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes such as 2,2'-di(tetrahydrofuryl) propane, di-piperidyl ethane, hexamethylphosphoramide, N,N'-dimethylpiperazine, diazabicyclooctane, diethyl ether, tributylamine, and the like. Details of linear and cyclic oligomeric oxolanyl coordinators can be found in, e.g., U.S. Pat. No. 4,429,091, the relevant teaching of which is incorporated herein by reference.

Although the ordinarily skilled artisan understands the type of conditions typically employed in solution polymerization, a representative description is provided for the convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to about 150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

Prior to being quenched, the polymer can be provided with a functional group of the general formula —NQOR$^1$ where Q and R$^1$ are defined as above. One method of effecting this functionalization involves introducing to the polymer cement a compound that includes at least one nitroso group, a variety of which are commercially available. Of those of particular utility are those of the general formula Q-N=O where Q is a moiety bonded to the nitroso nitrogen atom through a C, N, O, or S atom; respectively, these can be referred to as C-nitroso, N-nitroso, O-nitroso (commonly referred to as nitrite or oxynitroso), and S-nitroso compounds. The remaining group(s) attached to the C, N, O, or S atom can be a cyclic or acyclic aliphatic or an aromatic group such as substituted or unsubstituted aryl, alkyl, alkenyl, alkenaryl, aralkenyl, alkaryl, aralkyl, etc., group (with "substituted" being defined as above) or, together with the C, N, O, or S atom, can form a cyclic structure optionally incorporating additional heteroatoms.

Exemplary C-nitroso compounds include, but are not limited to, aliphatic materials such as nitrosomethane, nitrosoethane, nitroso-t-butane, and the like; alicyclic materials such as nitrosocyclopentane, nitrosocyclohexane, and the like; and aromatic materials such as nitrosobenzene, 2-nitrosotoluene, and N,N-dimethyl-4-nitrosoaniline. Exemplary N-nitroso compounds include, but are not limited to, 1-nitrosopyrrolidine, 1-nitrosopiperidine, and the like. Exemplary nitrite compounds include, but are not limited to, n-butyl nitrite and t-butyl nitrite, while exemplary S-nitroso compounds include the sulfur analogs of the foregoing nitrite compounds.

When a nitroso-containing compound is added to a polymer cement containing living (carbanionic) polymer chains, the nitroso nitrogen atom reacts at the anion, typically located at the end of the longest chain. (Where a multifunctional initiator is employed during polymerization, reaction with the foregoing types of compounds typically occurs on each terminus of the polymer.) Because of the reactivity of living polymers with nitroso functionality, reaction of the nitroso group with the living polymer can be performed quickly (e.g., ~15-60 minutes) using relatively mild (e.g., ~25°-75° C. and atmospheric or slightly elevated pressures) anhydrous and anaerobic conditions. Mixing of a type commonly employed in commercial processes is sufficient to ensure near stoichiometric reaction between the living polymer and the compound(s) that provides an oxyamine functional group.

At this point, the functionalized living polymer includes an anion of an oxyamine group bonded to a polymer chain. The anionic charge likely is localized on the oxygen atom of the original nitroso group, and the Q moiety remains bonded to the nitrogen atom, which has become attached to a terminus of the polymer chain. The $R^1$ group described previously can be provided through, and its identity or nature determined by, further reaction or through quenching of functionalized living polymer.

Quenching can be conducted by stirring the polymer and an active hydrogen-containing compound, such as an alcohol or acid, for up to about 120 minutes at temperatures of from about 25° to about 150° C. (Use of water can result in the formation of a stable salt.) Where an acid is used as a quenching agent, the resulting $R^1$ group is H.

Rather than quenching, the functionalized living polymer can be allowed to react with a compound containing an electrophilic group such as, e.g., an organohalide (particularly those where the halogen atom is Cl, Br, or I) with the residue of that compound becoming the $R^1$ group. Using this additional reaction method, the $R^1$ group can be a cyclic or acyclic aliphatic or aromatic group such as substituted or unsubstituted alkyl, cycloalkyl, aryl, alkenyl, etc., group. Exemplary $R^1$ groups include, e.g., 2-methylpropyl, 1-ethylbenzyl, diphenylmethyl, with those that help to stabilize the oxyamino ion (e.g., tertiary structures, allylic structures, conjugated allylic structures, etc.) being preferred. This reaction can be carried out under a wide range of conditions.

Solvent can be removed from the quenched polymer cement by conventional techniques such as drum drying, extruder drying, vacuum drying or the like, which may be combined with coagulation with water, alcohol or steam, thermal desolvation, etc.; if coagulation is performed, oven drying may be desirable.

Regardless of the identity of the $R^1$ group, the functionalized polymer can be utilized in a tread stock compound or can be blended with any conventionally employed tread stock rubber including natural rubber and/or non-functionalized synthetic rubbers such as, e.g., one or more of poly(isoprene), SBR, poly(butadiene), butyl rubber, neoprene, ethylene/propylene rubber (EPR), ethylene/propylene/diene rubber (EPDM), acrylonitrile/butadiene rubber (NBR), silicone rubber, fluoroelastomers, ethylene/acrylic rubber, ethylene/vinyl acetate interpolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% by wt. of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in J. Am. Chem. Soc., vol. 60, p. 309 et seq.) is a recognized method for determining surface area. BET surface area of silicas generally is less than 450 $m^2/g$, and useful ranges of surface are include from about 32 to about 400 $m^2/g$, about 100 to about 250 $m^2/g$, and about 150 to about 220 $m^2/g$.

The pH of the silica filler is generally from about 5 to about 7 or slightly over, preferably from about 5.5 to about 6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of about 1 to about 100 parts by weight (pbw) per 100 parts of polymer (phr), preferably in an amount from about 5 to about 80 phr. The useful upper range is limited by the high viscosity imparted by fillers of this type.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 $m^2/g$, are preferred; surface area values can be determined by ASTM D-1765 using the cetyltrimethyl-ammonium bromide (CTAB) technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical. When carbon black is used with silica, the amount of silica can be decreased to as low as about 1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of about 25%; accordingly, typical (combined) amounts of reinforcing fillers, i.e., silica and carbon black, is about 30 to 100 phr.

When silica is employed as a reinforcing filler, addition of a coupling agent such as a silane is customary so as to ensure good mixing in, and interaction with, the elastomer(s). Generally, the amount of silane that is added ranges between about 4 and 20% by weight, based upon the weight of silica filler present in the elastomeric compound.

Coupling agents can have a general formula of A-T-X, in which A represents a functional group capable of bonding physically and/or chemically with a group on the surface of the silica filler (e.g., surface silanol groups); T represents a hydrocarbon group linkage; and X represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the X and A functionalities mentioned above. One preferred coupling agent is bis[3-(triethoxysilyl)propyl]tetrasulfide.

Addition of a processing aid can be used to reduce the amount of silane employed; see, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful, as set forth below. The additional fillers can be utilized in an amount of up to about 40 phr, typically up to about 20 phr.

Other conventional rubber additives also can be added. These include, for example, process oils, plasticizers, antidegradants such as antioxidants and antiozonants, curing agents and the like.

All of the ingredients can be mixed using standard equipment such as, e.g., Banbury or Brabender mixers. Typically, the initial mixing (i.e., that which is not intended to immediately precede vulcanization) occurs at a temperature between about 140° and 160° C., often between about 145° and 155° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468, incorporated herein by reference. Sulfur curing typically occurs at about 170° C. and, accordingly, curing components typically are mixed at a temperature that is ~10° to ~20° C. higher than that employed in the initial mixing discussed above.

The following non-limiting, illustrative examples provide the reader with detailed conditions and materials that can be useful in the practice of the present invention.

EXAMPLES

In the examples, dried glass vessels previously sealed with extracted septum liners and perforated crown caps under a positive $N_2$ purge were used for all preparations. Butadiene (21.9% by wt. in hexane), styrene (33% by wt. in hexane), hexane, n-butyl-lithium (1.54 M in hexane), oligomeric oxolanyl propanes (1.6 M solution in hexane, stored over $CaH_2$), and butylated hydroxytoluene (BHT) solution in hexane were used.

Commercially available reagents and starting materials included the following, all of which were acquired from Sigma-Aldrich Co. (St. Louis, Mo.) and used without further purification unless otherwise noted in a specific example: 1-nitrosopyrrolidine, nitrosobenzene, 2-nitrosotoluene, N,N-dimethyl-4-nitrosoaniline, N,N-diethyl-4-nitrosoaniline, 2-chloro-2-methylpropane, (1-bromoethyl)benzene, and bromodiphenylmethane.

Testing data in the Examples was performed on filled compositions made according to the formulation shown in Tables 1a (carbon black only) and 1b (carbon black and silica). In these tables, N-phenyl-N'-(1,3-dimethylbutyl)-p-phenyldiamine acts as an antioxidant while benzothiazyl-2-cyclohexylsulfenamide, N,N'-diphenyl guanidine, and di(phenylthio)acetamide act as accelerators.

TABLE 1a

Compound formulation, carbon black only

| | Amount (phr) |
|---|---|
| Masterbatch | |
| Polymer | 100 |
| carbon black (N343 type) | 55 |
| Wax | 1 |
| N-phenyl-N'-(1,3-dimethylbutyl)-p-phenyldiamine | 0.95 |
| ZnO | 2.5 |
| stearic acid | 2 |
| aromatic processing oil | 10 |
| Final | |
| Sulfur | 1.3 |
| benzothiazyl-2-cyclohexylsulfenamide | 1.7 |
| N,N'-diphenyl guanidine | 0.2 |
| TOTAL | 174.65 |

TABLE 1b

Compound formulation, carbon black and silica

| | Amount (phr) |
|---|---|
| Masterbatch | |
| Polymer | 100 |
| Silica | 30 |
| carbon black (N343 type) | 35 |
| N-phenyl-N'-(1,3-dimethylbutyl)-p-phenyldiamine | 0.95 |
| stearic acid | 1.5 |
| aromatic processing oil | 10 |
| Re-mill | |
| 60% disulfide silane on carrier | 4.57 |
| Final | |
| ZnO | 2.5 |
| Sulfur | 1.7 |
| benzothiazyl-2-cyclohexylsulfenamide | 1.5 |
| di(phenylthio)acetamide | 0.25 |
| N,N'-diphenyl guanidine | 0.5 |
| TOTAL | 188.47 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Bound Rubber" were determined using the procedure described by J. J. Brennan et al., *Rubber Chem. and Tech.*, 40, 817 (1967).

Examples 1-5

To a $N_2$-purged reactor equipped with a stirrer was added 1.78 kg hexane, 0.38 kg styrene solution, and 2.32 kg butadiene solution. The reactor was charged with 3.67 mL n-butyllithium, followed by 1.05 mL of the OOPs solution.

The reactor jacket was heated to 50° C. and, after ~30 minutes, the batch temperature peaked at ~54° C. After an additional ~25 minutes, the polymer cement was transferred from the reactor to dried glass vessels.

Three samples were terminated with, respectively, 1-nitrosopyrrolidine (sample 2), nitrosobenzene (sample 3), 2-nitrosotoluene (sample 4), and N,N-dimethyl-4-nitrosoaniline (sample 5) in a 50° C. bath for ~30 minutes. These and a non-functionalized polymer (sample 1) were coagulated in isopropanol containing BHT and drum dried.

Using the formulation shown in Table 1a, vulcanizable elastomeric compounds containing reinforcing fillers were prepared from samples 1-5. Results of physical testing on these compounds are shown below in Table 2.

TABLE 2

Testing data from Examples 1-5

|  | 1 | 2 | 3 | 4 | 5 |
|---|---|---|---|---|---|
| $M_n$ (kg/mol) | 106 | 106 | 159 | 153 | 140 |
| $M_w/M_n$ | 1.06 | 1.09 | 1.15 | 1.16 | 1.16 |
| % coupling | 3.1 | 8.4 | 67.9 | 63.0 | 59.5 |
| $T_g$ (° C.) | −37.8 | −38.8 | −38.2 | −38.4 | −38.0 |
| Bound rubber (%) | 8.6 | 19.7 | 19.3 | 19.1 | 23.7 |
| 171° C. MDR $t_{50}$ (min) | 2.7 | 2.5 | 2.9 | 2.8 | 2.4 |
| 171° C. MH-ML (kg-cm) | 17.9 | 17.7 | 17.8 | 18.4 | 19.1 |
| $ML_{1+4}$ @ 130° C. | 25.3 | 30.4 | 54.6 | 54.9 | 50.8 |
| 300% modulus @ 23° C. (MPa) | 10.5 | 11.5 | 11.2 | 11.6 | 12.5 |
| Tensile strength @ 23° C. (MPa) | 16.9 | 19.2 | 19.4 | 18.9 | 18.2 |
| Temp. sweep 0° C. tan δ | 0.211 | 0.213 | 0.213 | 0.218 | 0.186 |
| Temp. sweep 50° C. tan δ | 0.274 | 0.259 | 0.238 | 0.232 | 0.227 |
| RDA 0.25-14% ΔG' (MPa) | 5.028 | 2.731 | 2.756 | 2.331 | 2.728 |
| 50° C. RDA strain sweep (5% strain) tan δ | 0.256 | 0.201 | 0.200 | 0.173 | 0.179 |
| 50° C. Dynastat tan δ | 0.2384 | 0.1944 | 0.1812 | 0.1718 | 0.1744 |

From the 50° C. strain sweep data of Table 2, one can see that styrene/butadiene interpolymers having oxyamine functional groups (Examples 2-5) can provide, compared to a control polymer, greater than a 20% reduction in tan δ when used in a carbon black-filled formulation. At the same time, wet traction performance (see the tan δ at 0° C. data, where larger values correlate generally to better wet traction) is not negatively impacted.

Examples 6-10

The procedure described with respect to Examples 1-5 was, in substantial part, repeated. In sample 6 (control), the living polymer was terminated with isopropanol. The living polymers in samples 7-10 were reacted with N,N-dimethyl-4-nitrosoaniline; the polymer from sample 7 was terminated, thus forming a hydroxylamine functional group, while the polymers from samples 8-10 were reacted with, respectively, 8—2-chloro-2-methylpropane, 9—(1-bromoethyl)benzene, and 10—bromodiphenylmethane.

Using the formulations from Tables 1a and 1b above, vulcanizable elastomeric compounds containing reinforcing fillers were prepared from samples 6-10. Results of physical testing on these compounds are shown below in Table 3. For those rows that include two data points, the upper is for a formulation from Table 1a, and the lower is for a formulation from Table 1b.

TABLE 3

Testing data from Examples 6-10

|  | 6 | 7 | 8 | 9 | 10 |
|---|---|---|---|---|---|
| $M_n$ (kg/mol) | 122 | 188 | 186 | 187 | 186 |
| $M_w/M_n$ | 1.04 | 1.29 | 1.33 | 1.32 | 1.29 |
| % coupling | 0 | 65.7 | 65.8 | 65.4 | 65.9 |
| $T_g$ (° C.) | −32.8 | −33.6 | −33.9 | −32.8 | −33.8 |
| Bound rubber (%) | 12.6 | 27.7 | 28.7 | 27.9 | 29.2 |
|  | 19.4 | 31.1 | 30.7 | 32.2 | 32.1 |
| 171° C. MDR $t_{50}$ (min) | 2.8 | 2.5 | 2.3 | 2.8 | 2.7 |
|  | 6.8 | 5.5 | 5.1 | 5.0 | 5.0 |
| 171° C. MH-ML (kg-cm) | 17.8 | 17.5 | 17.7 | 17.6 | 17.3 |
|  | 22.7 | 22.8 | 23.0 | 22.8 | 22.8 |
| $ML_{1+4}$ @ 130° C. | 27.8 | 68.0 | 68.7 | 69.0 | 69.7 |
|  | 70.1 | 123.2 | 122.4 | 124.6 | 123.0 |
| 300% modulus @ 23° C. (MPa) | 11.3 | 13.6 | 14.4 | 13.4 | 13.4 |
|  | 9.9 | 12.3 | 12.3 | 12.6 | 10.8 |
| Tensile strength @ 23° C. (MPa) | 16.3 | 19.0 | 18.6 | 19.9 | 19.0 |
|  | 14.0 | 13.5 | 14.7 | 15.6 | 15.2 |
| Temp. sweep 0° C. tan δ | 0.221 | 0.229 | 0.239 | 0.233 | 0.228 |
|  | 0.183 | 0.192 | 0.192 | 0.193 | 0.192 |
| Temp. sweep 50° C. tan δ | 0.258 | 0.208 | 0.201 | 0.204 | 0.194 |
|  | 0.219 | 0.198 | 0.190 | 0.190 | 0.191 |
| RDA 0.25-14% ΔG' (MPa) | 4.338 | 1.883 | 1.739 | 1.710 | 1.535 |
|  | 8.155 | 5.477 | 5.571 | 5.449 | 5.656 |
| 50° C. RDA strain sweep (5% strain) tan δ | 0.2470 | 0.1659 | 0.1493 | 0.1507 | 0.1422 |
|  | 0.2285 | 0.1730 | 0.1717 | 0.1708 | 0.1754 |
| 50° C. Dynastat tan δ | 0.2265 | 0.1461 | 0.1421 | 0.1456 | 0.1410 |
|  | 0.2055 | 0.1665 | 0.1623 | 0.1626 | 0.1631 |

From the 50° C. strain sweep data of Table 3, one can see that a styrene/butadiene interpolymer having a terminal oxyamine functional group (Example 7) again provides, compared to a control polymer, significant reductions in tan δ (~33% for carbon black only and ~24% carbon black plus silica formulations, respectively) while functional polymers that have undergone further reaction (Examples 8-10) can provide even greater reductions (carbon black only formulation) or approximately equivalent reductions (carbon black plus silica formulation) in tan δ.

From the foregoing description and illustrative examples, the ordinarily skilled artisan will be able to envision a variety of insubstantial modifications and alterations. The illustrative embodiments set forth herein should not be used to unduly limit the full scope to be accorded to the inventions set forth in the appended claims.

What is claimed is:

1. A macromolecule comprising a polymer chain that comprises polyenemer and, bonded to a terminus of said polymer chain, a functional group having the general formula

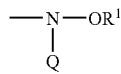

wherein
R$^1$ is —CH$_2$Z where Z is H or a substituted or unsubstituted aryl, alkyl, alkenyl, alkenaryl, aralkenyl, alkaryl, or aralkyl group, and
Q is a moiety connected to the nitrogen atom of said functional group through a C, N, O, or S atom.

2. The macromolecule of claim 1 wherein said polymer chain is substantially linear.

3. The macromolecule of claim 1 wherein R$^1$ is an alkyl or alkaryl group.

4. The macromolecule of claim 1 wherein Q comprises a cyclic structure.

5. The macromolecule of claim 4 wherein said cyclic structure comprises aromaticity.

6. The macromolecule of claim 5 wherein said cyclic structure comprises additional functionality.

7. The macromolecule of claim 1 wherein R$^1$ is the residue of a compound comprising an electrophilic functionality.

8. The macromolecule of claim 1 wherein said macromolecule is the reaction product of a carbanionic polymer and a compound comprising nitroso functionality.

9. A composition comprising at least one particulate filler and the macro-molecule of claim 1.

10. A functional polymer comprising the reaction product of an electrophilic group and a living polymer comprising the residue of nitroso functionality.

11. The functional polymer of claim 10 wherein said polymer chain is elastomeric.

12. The functional polymer of claim 10 wherein said polymer chain is substantially linear and wherein the residue of said electrophilic group is at a terminus of said polymer.

13. The functional polymer of claim 10 wherein the nitrogen atom of said nitroso functionality also is bonded directly to a C, N, O, or S atom.

14. The functional polymer of claim 10 wherein said residue of nitroso functionality is derived from a compound having the general formula Q—N=O wherein Q is a moiety that comprises a C, N, O, or S atom bonded directly to the nitrogen atom of said nitroso functionality.

15. The functional polymer of claim 14 wherein Q comprises a cyclic structure.

16. The functional polymer of claim 15 wherein said cyclic structure comprises aromaticity.

17. The functional polymer of claim 16 wherein said cyclic structure comprises additional functionality.

18. The functional polymer of claim 17 wherein said additional functionality comprises a nitrogen atom.

19. A composition comprising at least one particulate filler and the functional polymer of claim 10.

20. The composition of claim 1 wherein said polymer chain further comprises pendent aromatic groups.

* * * * *